United States Patent
TenBrink et al.

[11] Patent Number: 5,996,408
[45] Date of Patent: Dec. 7, 1999

[54] WHEEL SPEED SENSOR WITH STAND-OFF TABS

[75] Inventors: Jay T. TenBrink, Goodrich; Kurt H. Stroeters, Clawson; Richard Burns, Rochester Hills; Rene J. Bacholzky, Birmingham; Ray Janssen, Lake Orion, all of Mich.

[73] Assignee: Chrysler Corporation, Auburn Hills, Mich.

[21] Appl. No.: 09/156,016

[22] Filed: Sep. 17, 1998

[51] Int. Cl.[6] ................ G01P 1/02; G01P 3/48; H02K 19/20
[52] U.S. Cl. ................ 73/493; 324/173; 310/168
[58] Field of Search ................ 73/493, 660, 661, 73/866.5, 494; 324/173, 174, 207.22, 207.25; 310/168, 155; 384/448, 446

[56] References Cited

U.S. PATENT DOCUMENTS

| | | | |
|---|---|---|---|
| 3,854,556 | 12/1974 | Gee | 188/181 |
| 3,872,720 | 3/1975 | Fleagle et al. | 73/121 |
| 3,910,386 | 10/1975 | Stigall et al. | 188/181 |
| 3,961,215 | 6/1976 | Gee et al. | 310/168 |
| 3,966,027 | 6/1976 | Plitzkow | 188/182 |
| 3,988,624 | 10/1976 | Urban | 310/168 |
| 4,171,495 | 10/1979 | McNinch, Jr. | 310/155 |
| 4,347,024 | 8/1982 | Coldren | 411/11 |
| 4,510,408 | 4/1985 | Jovick et al. | 310/168 |
| 4,626,781 | 12/1986 | Forkel | 324/174 |
| 4,658,168 | 4/1987 | Belart et al. | 310/168 |
| 4,788,870 | 12/1988 | Gath et al. | 73/866.5 |
| 4,921,380 | 5/1990 | Tronetti, Jr. | 411/8 |
| 4,988,220 | 1/1991 | Christiansen et al. | 324/207.25 |
| 5,006,797 | 4/1991 | Smith | 324/173 |
| 5,011,302 | 4/1991 | Mott et al. | 384/448 |
| 5,211,061 | 5/1993 | Goodwin | 73/862.541 |
| 5,291,130 | 3/1994 | Kendzior | 324/174 |
| 5,325,734 | 7/1994 | Jordan | 73/866.5 |
| 5,488,871 | 2/1996 | Harbottle et al. | 73/862.55 |
| 5,615,575 | 4/1997 | Goodwin | 73/862.541 |

*Primary Examiner*—Hezron Williams
*Assistant Examiner*—Helen C. Kwok
*Attorney, Agent, or Firm*—Lawrence Shurupoff

[57] ABSTRACT

A speed sensor assembly is mounted to a steering knuckle with a threaded fastener. The fastener is initially hand tightened until it is axially obstructed by a spacer provided on the speed sensor assembly. A tool then is used to apply high torque to the fastener so as to deflect or break away the spacer so that the speed sensor assembly may be tightly clamped to the steering knuckle by the fastener. The spacer prevents hand tightened speed sensor assemblies from being properly aligned with a tone wheel. Unless a tool is used to fully seat the speed sensor assembly, the assembly will give a false test signal indicative of improper or incomplete mounting.

9 Claims, 3 Drawing Sheets

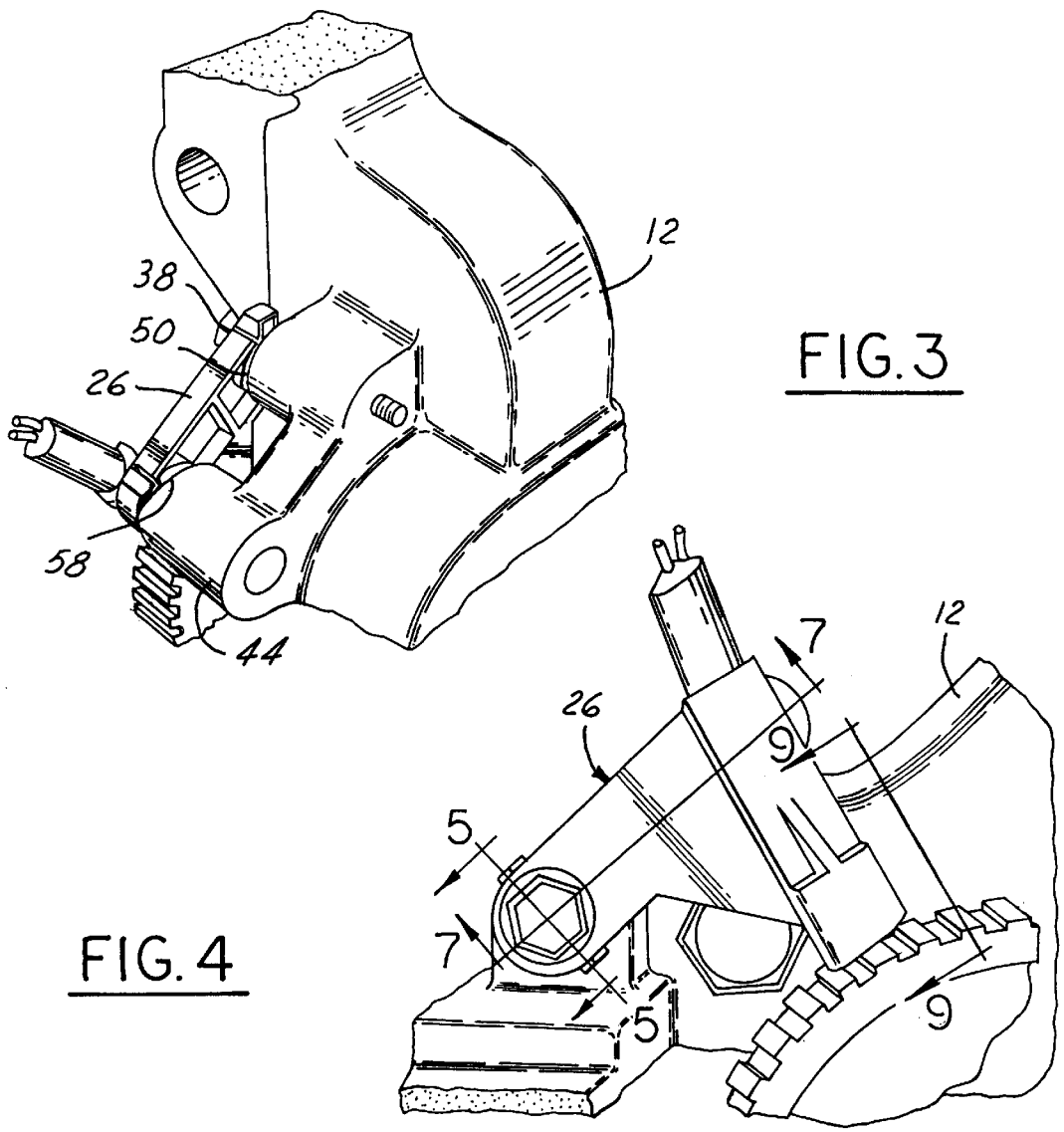
FIG.3
FIG.4
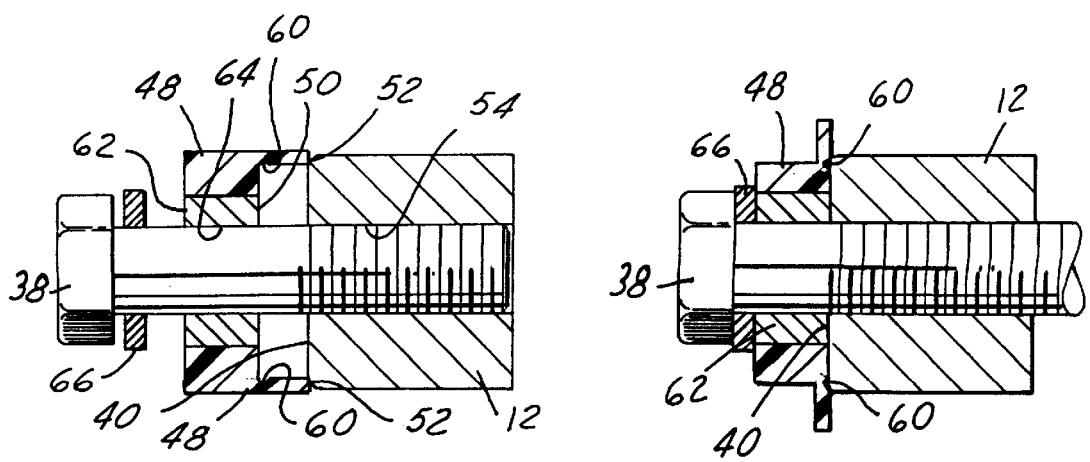
FIG.5
FIG.6

WHEEL SPEED SENSOR WITH STAND-OFF TABS

BACKGROUND OF THE INVENTION

1. Field of the Invention

The present invention relates in general to a mounting arrangement for a wheel speed sensor and in particular to a wheel speed sensor having a frangible or bendable mounting spacer.

2. Description of Prior Developments

Wheel speed sensors are typically mounted to a wheel support, such as a steering knuckle, for providing a pulsed speed signal to an antilock brake system (ABS). The sensors are mounted to the wheel support with threaded fasteners such as bolts. The bolts are initially hand threaded into threaded bores formed in the wheel support and subsequently tightened using a tool such as an air driven socket wrench.

When the bolts are tightened, the wheel speed sensor is locked in alignment with a toothed pulse wheel or tone wheel that rotates with the vehicle wheel. Before leaving the vehicle assembly plant, the sensors are checked for proper alignment and proper mounting with respect to the steering knuckle and tone wheel. If the sensor is properly aligned with the tone wheel, electronic test fixtures will provide a signal indicative of proper alignment and a "closed" circuit. If the sensor is not properly aligned, an open circuit is indicated.

Unfortunately, a situation can arise where a sensor is mounted to the wheel support with a hand tightened bolt that is not fully seated by a tool such as an air wrench. In this case, the sensor can be properly aligned with the tone wheel, provide a positive test signal to a test apparatus, yet when placed in service, fall off the wheel support and generate a fault signal to the driver of the vehicle.

Accordingly, what is needed is a method and apparatus for mounting a speed sensor to a wheel support in such a manner that if the fastener which secures the sensor to the support is tightened by hand only, the sensor will be prevented from being properly aligned with the tone wheel. This in turn will prevent a test apparatus from providing an acceptable or positive indication that the sensor is properly installed. In this manner, the sensor cannot leave the vehicle assembly plant without being tightened by a tool, thereby preventing the subsequent loss or misalignment of the sensor due to insufficient torque applied to its mounting hardware.

SUMMARY OF THE INVENTION

The present invention has been developed to fulfill the needs noted above and therefore has as an object the provision of a speed sensor for vehicle antilock brake system which is rendered inoperative unless mounted to a wheel support with the aid of a tool.

Another object of the invention is to prevent a speed sensor from being properly aligned with a tone wheel by the use of manual hand installation force alone.

Another object of the invention is the provision of a frangible or bendable tab which prevents a sensor from being fully seated by hand force and which bends or breaks only under the high installation force provided by a hand tool or power tool.

These and other objects are met by the present invention which is directed to a speed sensor provided with a stand-off or projection which positively prevents an assembly worker or other installer from fully seating and properly aligning the sensor with a tone wheel, unless supplemental mounting force is applied to a mounting fastener by, for example, a hand tool or power tool. In accordance with the invention, one or more tabs are located between the mounting surface on the sensor and the mating mounting surface on the wheel support.

In order for the sensor to be fully and properly seated on its wheel support mounting surface, the tab or tabs must be bent or broken away. The tabs are designed to be strong enough to prevent their bending and breaking from the maximum amount of force capable of being applied to the sensor mounting fastener by hand strength alone. Supplemental force from a tool is needed to bend or break the tabs and allow the sensor to be fully and properly seated. Only then will the sensor give a positive test signal that it is properly installed.

BRIEF DESCRIPTION OF THE DRAWINGS

In the drawings:

FIG. 3 is a rear view of FIG. 2;

FIG. 4 is a front fragmental view of the speed sensor and tone wheel of FIG. 3;

FIG. 5 is a view in section taken along line 5—5 of FIG. 4 showing a fastener and stand-off tabs in hand tightened positions;

FIG. 6 is a view of the fastener and stand-off tabs of FIG. 1 in a fully seated position after being tightened with a hand tool;

In the drawings, like reference characters designate like or similar parts.

DETAILED DESCRIPTION OF THE PREFERRED EMBODIMENT

Figure 1:
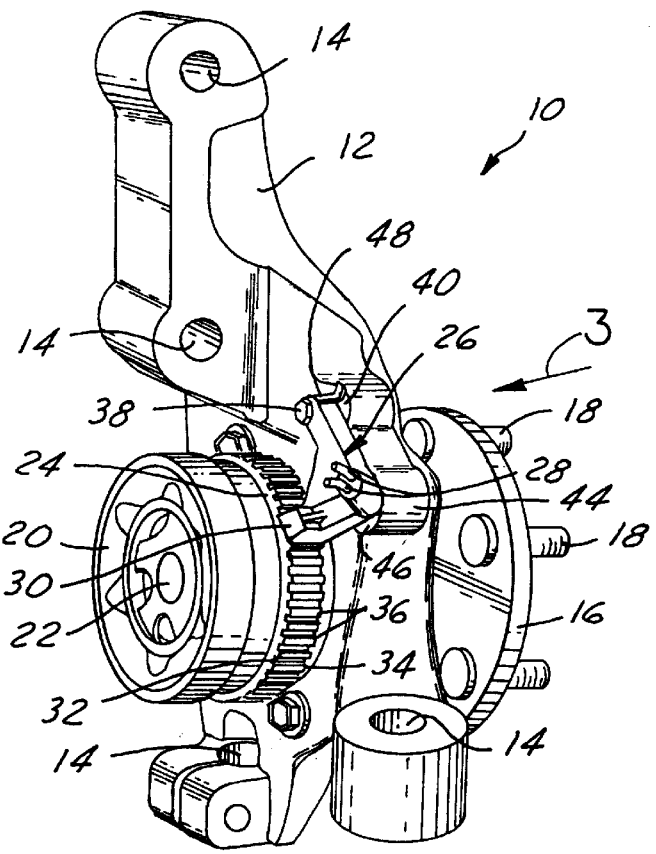
FIG. 1 is a perspective view of a speed sensor mounted to a steering knuckle and provided with stand-off tabs constructed in accordance with the invention.
Figure 2:
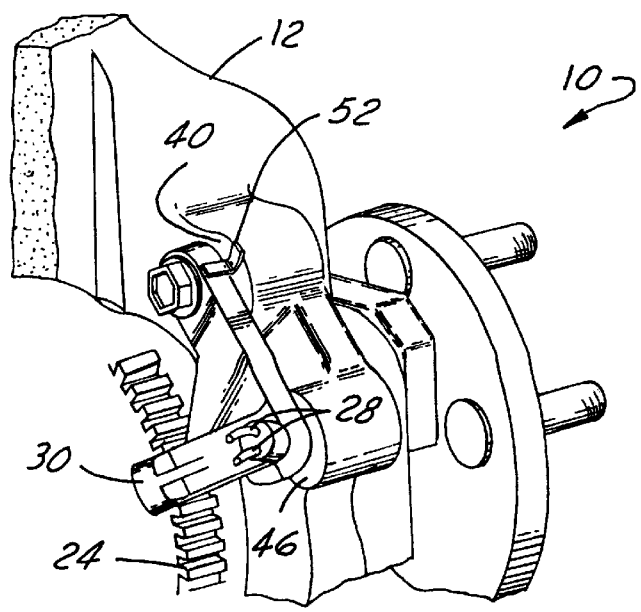
FIG. 2 is a perspective enlarged fragmental view of the speed sensor and steering knuckle of FIG. 1.

The present invention will now be described in conjunction with the drawings, beginning with FIG. 1 which shows a vehicle steering knuckle assembly 10 of generally well-know construction. The steering knuckle assembly 10 includes a cast metal mounting member in the form of knuckle 12 having mounting bores 14 for mounting the assembly to an upper control arm or strut. A mounting plate 16 with studs 18 is provided on the knuckle assembly 10 for rotatably mounting a road wheel to the knuckle assembly.

A constant velocity joint assembly 20 is connected to the mounting plate 16 and is rotatably mounted to knuckle 12. Bore 22 in joint 20 receives a drive axle for driving the mounting plate 16 and road wheel. A toothed metal ring 24, known as a tone wheel, is fixed to the constant velocity joint assembly 20 and rotates with the road wheel.

A speed sensor assembly 26 is mounted to the knuckle 12 and aligned with the tone wheel 24 to produce a signal representative of the rotational speed of the road wheel.

Electrical leads 28 transmit the pulsed speed signal from the speed sensor assembly 26 to an antilock brake system processor which controls the operation and actuation of the antilock brake system (ABS).

In order for the ABS to function properly, a sensor 30 located on the speed sensor assembly 26 must be accurately aligned over the tone wheel 24. The sensor 30 must be positioned at a pre-set radial distance spaced away from the tone wheel and must be axially aligned at least partially between the opposite ends 32, 34 of the tone wheel teeth 36.

A fastener, such as threaded bolt 38 is used to clamp the speed sensor assembly 26 to a flat mounting surface 40 formed on steering knuckle 12. A mounting and alignment pin 42 (FIGS. 7 and 9) is closely fitted into a bore formed in a mounting boss 44 formed on knuckle 12. When the bolt 38 is tightly torqued down, the speed sensor 30 is properly aligned with respect to the tone wheel 24 as the speed sensor assembly 26 is clamped against mounting surface 40 as well as against flat mounting surface 46 formed on mounting boss 44.

However, if the bolt 38 is not fully torqued down, the speed sensor assembly will not be properly seated and rigidly aligned with the tone wheel. This can lead to the problems noted above. Up to this point, the description of the steering knuckle assembly 10 has been of a conventional, known design.

In order to prevent the inadvertent incomplete seating of the sensor assembly 26 on the knuckle 12 due to failure to fully tighten the bolt 38, the sensor assembly 26 is provided with at least one stand-off member such as semi-rigid spacer 48. As seen in the example of FIG. 5, spacer 48 can take the form of a plastic finger extension or tab which projects outwardly adjacent to the flat mounting surface 50 (FIG. 3) formed on the underside of the sensor assembly 26. In this case, the body of the sensor assembly 26 is formed of a molded plastic material and a pair of plastic spacers 48 is homogeneously molded to the sensor assembly during molding.

The spacers 48 are positioned on the sensor assembly 26 such that their free ends 52 will engage mounting surface 40 as the sensor assembly is initially mounted to the steering knuckle 12. As seen in FIG. 5, the length of the spacers 48 is set to allow bolt 38 to be partially hand threaded into a threaded bore 54 formed in mounting surface 40.

Figure 7:
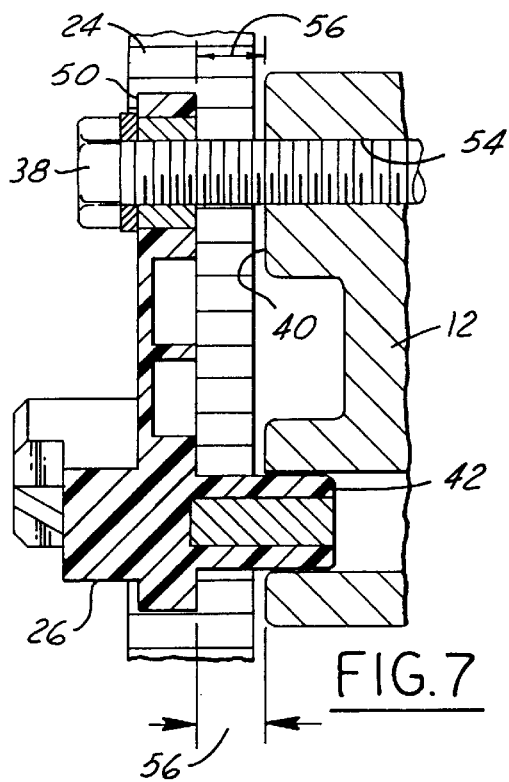
FIG. 7 is a view in section taken along line 7—7 of FIG. 4.
Figure 9:
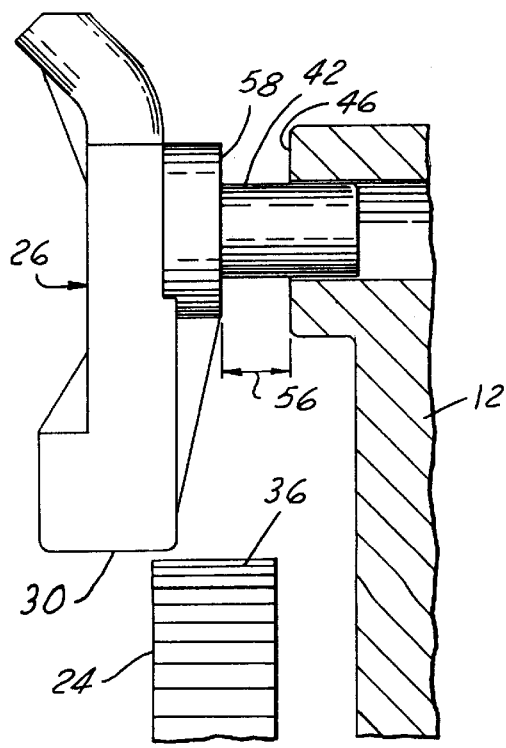
FIG. 9 is a view of the alignment and mounting pin of the speed sensor held separated from the wheel support.

As an installer or assembly worker hand tightens bolt 38 during the mounting of the sensor assembly 26 on the steering knuckle 12, the spacers 48 engage surface 40 and prevent the further hand tightening of bolt 38 as shown in FIG. 5. At this point, the sensor 30 is prevented from being properly axially aligned over the tone wheel teeth 36 by the use of hand tightening alone. This misalignment is shown in FIGS. 7 and 9. The stand-off or separation distance of the sensor assembly mounting surface 50 from the mating knuckle mounting surface 40 is represented in FIGS. 7 and 9 as spacing 56.

In order to fully seat the spacer assembly on the steering knuckle and thereby properly align the sensor with the tone wheel, a high torque must be applied to bolt 38 which is higher than that capable of being applied by manual finger tightening alone. In this stand-off position, the sensor 30, when tested before leaving the manufacturing site, will not produce a proper signal due to its misalignment with the tone wheel. This fault signal will then alert the manufacturer or assembler that the sensor mounting should be checked for proper seating with an installation tool.

In the normal course of assembly, a hand tool such as a wrench, or a power tool such as a nut runner is used to complete the torquing of bolt 38 into bore 54. As this high torque is applied to bolt 38, the spacers 48 are either deflected out of the way of the sensor assembly 26 or are fractured and deflected away and/or snapped off of the sensor assembly.

As seen in FIG. 6, the spacers 48 have been deflected outwardly and away from bolt 38 under the compressive clamping force applied by bolt 38 as it is torqued down by a tool. This allows tight clamping engagement between surfaces 40 and 50, and between surface 46 and 58 on the sensor assembly and steering knuckle as shown in FIGS. 6, 8 and 10.

Notches or score lines 60 may be formed at the base of each spacer 48 as seen in FIGS. 5 and 6 to provide for predetermined deflection or fracture points on the spacers 48. Annular metal compression limiters 62 may be insert molded around mounting bore 64 formed in the sensor assembly 26. Washer 66 may also be used with bolt 38 in a conventional manner.

Figure 8:
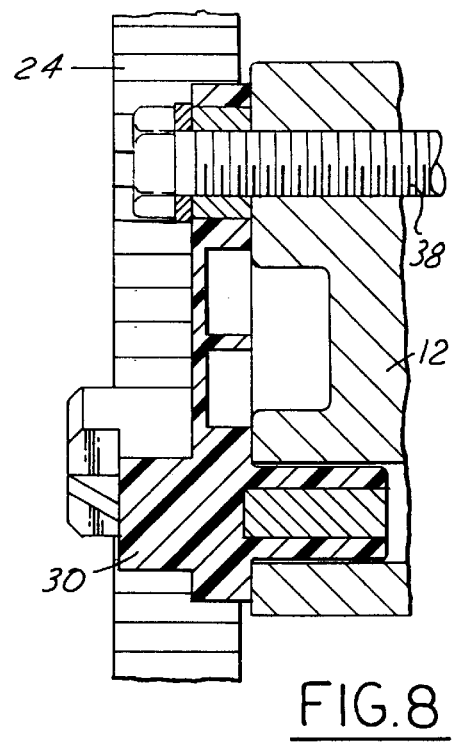
FIG. 8 is a view of FIG. 7 showing the sensor fully seated against the wheel support.
Figure 10:
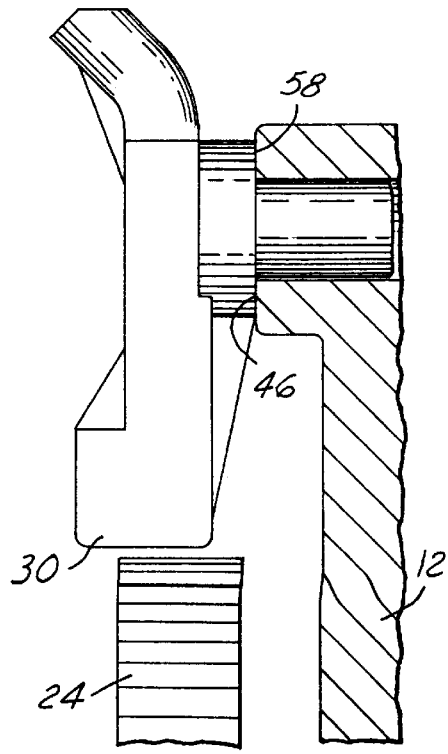
FIG. 10 is a view of FIG. 9 showing the speed sensor alignment and mounting pin in a fully seated position.

When bolt 38 is fully seated, as shown in FIGS. 6 and 8, the sensor 30 is thereby properly aligned axially and radially over the tone wheel 24 as shown in FIG. 10. In this case, the sensor will provide an appropriate signal when tested prior to leaving the manufacturing or assembly site.

It should be noted that spacers 48 can be located virtually anywhere between the mounting surfaces on the sensor assembly and the steering knuckle. By having the spacers 48 attached to the sensor assembly 26, the spacers cannot be inadvertently omitted during installation as is the case with a stack of washers such as belleville or lock washers positioned around bolt 38.

It should be understood that while this invention has been discussed in connection with one particular example, those skilled in the art will appreciate that other modifications can be made without departing from the spirit of this invention after studying the specification, drawings, and the following claims.

What is claimed is:

1. A mounting assembly for a speed sensor, comprising:
   a mounting member;
   a tone wheel rotatably mounted to said mounting member;
   a speed sensor assembly at least partially mounted to said mounting member; and
   a spacer comprising a deflectable projecting extension connected to said speed sensor assembly and extending between said speed sensor assembly and said mounting member for spacing said speed sensor assembly in a misaligned position with respect to said tone wheel; said spacer preventing proper alignment of said speed sensor assembly with said tone wheel with hand strength alone, and allowing alignment of said speed sensor assembly with said tone wheel by compressing said extension with a tool.

2. The mounting assembly of claim 1, wherein said speed sensor assembly comprises a plastic molding and wherein said spacer comprises a plastic material homogeneously formed on said plastic molding.

3. The mounting assembly of claim 1, wherein said spacer comprises a frangible spacer.

4. The mounting assembly of claim 1, wherein said mounting member comprises a steering knuckle.

5. A sensor assembly, comprising:
   a plastic molded member having a mounting surface; a tone wheel provided on said plastic molded member;
   a sensor provided on said plastic molded member; and a spacer comprising a deflectable projecting extension molded on said plastic molded member adjacent to and projecting outwardly from said mounting surface; said spacer preventing proper alignment of said sensor with said tone wheel with hand strength alone, and allowing alignment of said sensor with said tone wheel by compressing said extension with a tool.

6. The assembly of claim 5, wherein said spacer comprises a frangible finger.

7. The assembly of claim 5, wherein said spacer comprises a fracture notch for fracturing said spacer.

8. A method of mounting a speed sensor assembly having a spacer to a mounting member with a threaded fastener comprising:

loosely mounting said speed sensor assembly to said mounting member with said fastener by loosely threading said fastener into said mounting member with a low torque so that said spacer extends between said spaced sensor assembly and said mounting member;

preventing proper alignment between said sensor assembly and said mounting member with said spacer using hand strength alone;

tightly mounting said loosely mounted spaced sensor assembly to said mounting member by tightly threading said fastener into said mounting member with a high torque; and deflecting said spacer out of position between said sensor assembly and said mounting member with said high torque.

9. The method of claim 8, wherein said low torque is applied by manual finger torque and wherein said high torque is applied by a tool.

* * * * *